Nov. 4, 1941.    L. B. HADDAD    2,261,250

ELECTRIC MOTOR

Filed Dec. 28, 1939

High Positive Temperature Coefficient

High Positive Temperature Coefficient

INVENTOR
LABEEB B. HADDAD
BY
ATTORNEY

Patented Nov. 4, 1941

2,261,250

UNITED STATES PATENT OFFICE 2,261,250

ELECTRIC MOTOR

Labeeb B. Haddad, Hamden, Conn.

Application December 28, 1939, Serial No. 311,259

1 Claim. (Cl. 172—278)

This invention relates to electric motors of the induction type and is particularly directed to single phase induction motors of the split-phase and shaded-pole types.

A split-phase induction motor has two primary windings or phases, a main and auxiliary winding, usually displaced by 90 electrical degrees in space. The main winding has a comparatively high reactance and low resistance, while the auxiliary winding has a lower reactance and a higher resistance causing the currents in the two windings to be out of phase in time. This displacement in time phase as well as in space phase causes the motor to start. Generally, in order to produce a relatively large starting torque, a comparatively large current is allowed to flow through the auxiliary winding on starting. In order to produce a relatively high efficiency when the motor is running continuously, and to prevent overheating, the auxiliary winding is disconnected from the line or from the motor or from both by centrifugal means, for example—a centrifugal switch, or by other automatic means such as a magnetic switch. Sometimes the centrifugal switch is omitted, the size of the wire in the auxiliary being made large enough to avoid excessive heating and a resistor having a comparatively high resistance is placed in series with the auxiliary winding, resulting in a motor which is comparatively inefficient or one which has a low starting torque depending on the design of the motor and the value of resistance selected. In the shaded-pole motor the auxiliary winding consists of a shading coil or a group of shading coils which are usually displaced by about 45 electrical degrees from the main winding or windings and short-circuited. It is quite common to have a single short-circuited turn of wire at each pole. The application of this invention to the shaded-pole motor refers more specifically to the type which has a wound auxiliary. Ordinarily this auxiliary is short-circuited on itself but it may have an external resistor in series with it in which case the winding is short-circuited through this resistor. Usually this type of motor has a comparatively low starting torque and a comparatively low efficiency. The resistance of the shading coil is made large enough for continuous operation, hence the starting torque is relatively small. If a resistor of zero temperature coefficient of resistivity is placed in series with the shading coil the motor may be designed to give a larger starting torque but in that case the efficiency near full load will be lowered.

It is therefore the object of this invention to construct and produce an improved induction single-phase motor, whether it be of the split-phase or shaded-pole type, which will have a high starting torque and equally high running efficiency, and one in which the current flowing in the auxiliary winding is automatically reduced to a negligible minimum after the motor has started and is running at or near rated speeds.

Also, a further object of the invention is to accomplish this result without the aid of any mechanical means whatsoever and to accomplish this result by means which are elastic in nature so as to be capable of adaptation for various requirements. This is accomplished by introducing a resistor having a relatively high positive temperature coefficient of resistivity and a relatively low thermal capacity, said resistor being connected to the auxiliary winding.

The construction and operation of an induction single-phase motor of the split-phase type, as well as that of the shaded-pole type, will be more fully understood from the following specification and the accompanying drawing in which.

Figure 1:
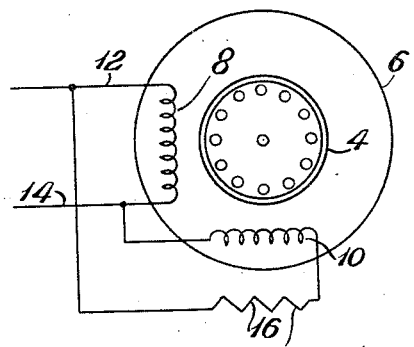
Fig. 1 is a diagrammatic view showing the application of my invention to a squirrel cage split-phase induction motor.

Referring to the drawing in which like reference characters indicate like parts, and beginning with Fig. 1, the conventional split-phase induction motor is provided with a rotor 4 and a stator 6, the stator having the main winding 8 and the auxiliary winding 10. The main winding 8 is connected directly to the supply leads 12 and 14. 16 designates a resistor having a relatively high positive temperature coefficient of resistivity. One side of the auxiliary winding 10 is connected to the supply lead 14 and the other side of the auxiliary winding 10 is connected to one side of the resistor 16. The other side of the resistor 16 is connected to the supply lead 12. The auxiliary winding 10 and the resistor 16 are thus connected in series across the line.

Figure 2:
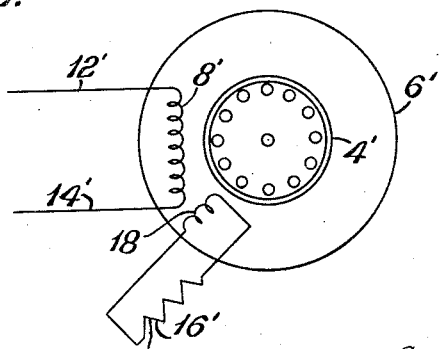
Fig. 2 is a diagrammatic view similar to Fig. 1 showing the application of my invention to a squirrel cage shaded-pole type of motor.

In Fig. 2 I have shown the application of my invention to a shaded-pole induction type motor which has the same rotor 4' and stator 6' and which also has the main winding 8'. This type of motor is provided with a shading coil 18 which is displaced by 45 electrical degrees from the main winding 8'. In this construction the main winding 8' is connected directly to the leads 12' and 14'. Also in this construction I utilize a resistor 16' which is similar to the resistor 16 described in connection with Fig. 1 and the leads of the resistor 16' are connected to those of the shading coil 18. Thus the shading coil 18 is short-circuited through the resistor 16'.

The resistors 16 and 16' may be made of any desired metal having the prescribed qualifications and, by way of example, they may be made of nickel or iron wire, or an iron or nickel wire ballast tube may be used.

When a motor constructed as shown in Fig. 1 is started, the resistor or ballast tube is cold and its resistance is small. Therefore a large current flows through the auxiliary winding 10 thus giving the motor a relatively great starting torque. As the motor comes up to speed and the resistor or ballast tube gets hot, the resistance of the resistor or ballast tube is proportionately increased thus liming the amount of current flowing in the auxiliary winding 10 through the resistor 16. By selecting the proper value of resistance of the element 16, the losses in the auxiliary winding 10 during normal operation of the motor when it has reached full speed can be made relatively small and comparatively high torques can be produced on starting and while the motor is coming up to speed. Since the thermal capacity of the resistor is relatively small, it will become cold again soon after the motor is stopped and the current is shut off so that the motor embodying this construction can be started again and produce the required high torque without the necessity of waiting a long interval pending cooling of the resistor 16.

In connection with the construction illustrated in Fig. 2, the function of the resistor 16' is identical to the function of the resistor 16 in Fig. 1, in that, while it is cold, it allows a relatively high current in the shading coil 18 to give a comparatively large starting torque and, as the resistor 16' gets heated, its resistance increases thus limiting the flow of current in the shading coil 18.

The resistors 16 and 16', while primarily designed to permit high current in the auxiliary winding 10 or the shading coil 18 to insure large starting torque, can also be used with benefit in connection with a motor where no high torque is required since the introduction of such a resistor will improve the efficiency of the motor materially during its normal operation at or near rated load and rated speed.

If a motor such as is illustrated in Fig. 1 or in Fig. 2 is provided with a fly wheel or some other mechanism or load causing it to come up to speed relatively slowly, the thermal capacity of the resistors 16 or 16' can be made greater so as to maintain a high current in the auxiliary winding 10 or the shading coil 18 for a longer period, or long enough to permit the motor to come up to speed before the heat in the resistor limits the current in the auxiliary winding 10 or the shading coil 18. It is of course understood that the thermal capacity of the resistors is subject to variation and selection according to the requirements of any particular case.

It is to be noted that the resistance of the positive temperature coefficient resistor increases with its heat and thus tends to limit the current in the auxiliary winding to a smaller value than would otherwise flow if the resistance were constant. Therefore, by properly selecting the value of the resistor, the current flowing in the auxiliary may be accurately controlled and may be made less equal to, or greater than, the current that would flow through the auxiliary winding at a standstill, although in actual practice and during normal operation the current in the auxiliary winding would be made as small as possible consistent with the practicability of the design.

While I have shown and described one form of my invention as applied to an induction motor of the split-phase type, and one way of applying my invention to a motor of the shaded-coil type, it is to be understood that the disclosure is to be considered as illustrative rather than delimitive of the invention and that my invention is capable of various modifications without departing from the spirit and scope of the invention.

Having thus described my invention, what I claim as new and desire to secure by Letters Patent is:

The combination with a single-phase induction shaded-pole motor having a rotor, a stator, a primary winding and a shading coil angularly displaced with respect to said primary windings, of a nickel wire resistor exterior to said motor and having a relatively high positive temperature coefficient of resistivity, said resistor being connected directly to the leads of said shading coil whereby a relatively high current flows through said shading coil for starting said motor, and whereby the heating of said resistor limits the current flowing through said shading coil.

LABEEB B. HADDAD.